US011186402B2

(12) United States Patent
Hickman

(10) Patent No.: US 11,186,402 B2
(45) Date of Patent: Nov. 30, 2021

(54) LABEL COUNTING REWIND MACHINE

(71) Applicant: Todd Hickman, Fenton, MO (US)

(72) Inventor: Todd Hickman, Fenton, MO (US)

(73) Assignee: HICKMAN HOLDINGS CORP., Fenton, MO (US)

( * ) Notice: Subject to any disclaimer, the term of this patent is extended or adjusted under 35 U.S.C. 154(b) by 71 days.

(21) Appl. No.: 16/699,870

(22) Filed: Dec. 2, 2019

(65) Prior Publication Data

US 2021/0163168 A1  Jun. 3, 2021

(51) Int. Cl.
*B65C 9/42* (2006.01)
*B65C 9/18* (2006.01)
*G05B 19/18* (2006.01)

(52) U.S. Cl.
CPC .................. *B65C 9/42* (2013.01); *B65C 9/18* (2013.01); *G05B 19/18* (2013.01)

(58) Field of Classification Search
CPC .... B65C 9/18; B65C 9/40; B65C 9/42; B65C 2210/0083; G05B 19/18
See application file for complete search history.

(56) References Cited

U.S. PATENT DOCUMENTS

| 4,294,644 A | 10/1981 | Anderson |
| 4,383,880 A | 5/1983 | Geurtsen et al. |
| 5,133,396 A | 7/1992 | Selak et al. |
| 5,730,816 A | 3/1998 | Murphy |
| 5,825,307 A | 10/1998 | Titus et al. |
| 6,215,119 B1 | 4/2001 | Markham et al. |
| 6,428,639 B1 | 8/2002 | Oldenburg et al. |
| 6,660,992 B2 | 12/2003 | Yang |
| 2005/0190368 A1* | 9/2005 | Ehrhardt, Jr. ............. B65C 9/42 356/431 |
| 2006/0180737 A1 | 8/2006 | Consiglio |
| 2015/0274346 A1* | 10/2015 | Buckby ..................... B65C 9/42 156/64 |

* cited by examiner

*Primary Examiner* — George R Koch
(74) *Attorney, Agent, or Firm* — Sandberg Phoenix & von Gontard, P C.

(57) ABSTRACT

A label rewind machine counts labels on a label roll having an elongated web with labels attached. The rewind machine has an unwind spindle and a rewind spindle, and a first label sensor and a second label sensor. The label roll is placed on the unwind spindle, and the web is threaded through the first and second sensors and attached to the rewind spindle, creating a web path. As the web is drawn along the web path, each sensor detects the presence or absence of a label on the web proximate that sensor and generates an electronic signal. Together, the sensors generate a specific quadrature sequence dictated by the presence of labels on the web. If the detected sequence mimics a selected sequence, the rewind machine records a unitary count of one label. The label count is indexed by one each time the rewind machine detects the selected sequence.

18 Claims, 6 Drawing Sheets

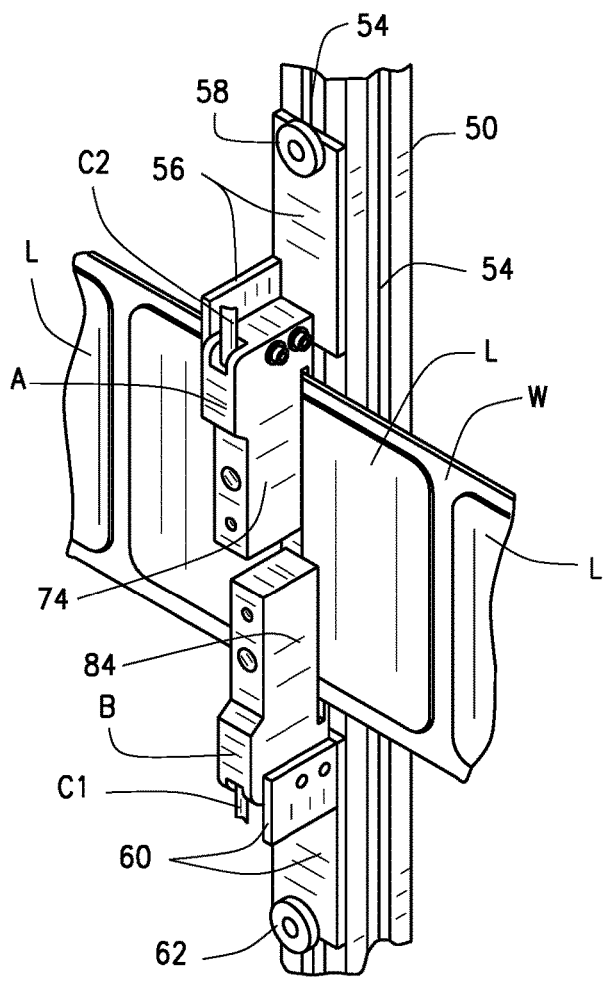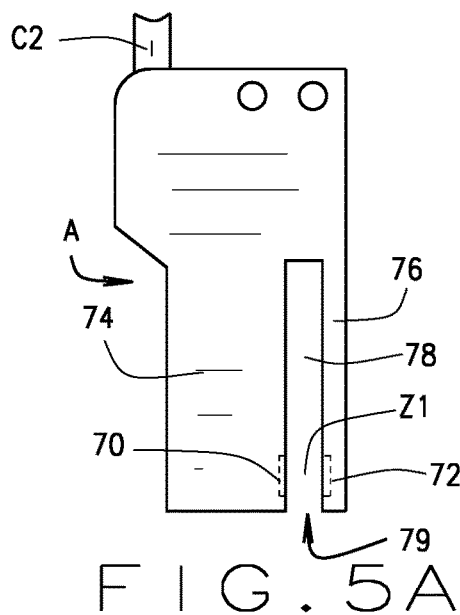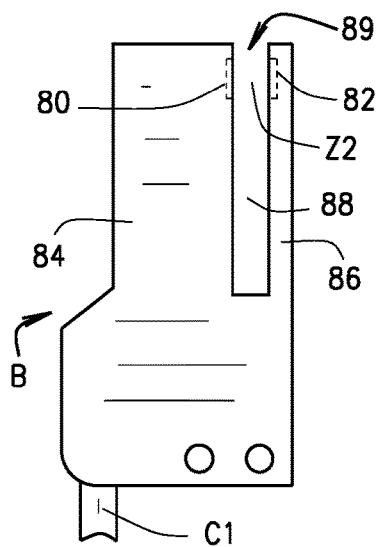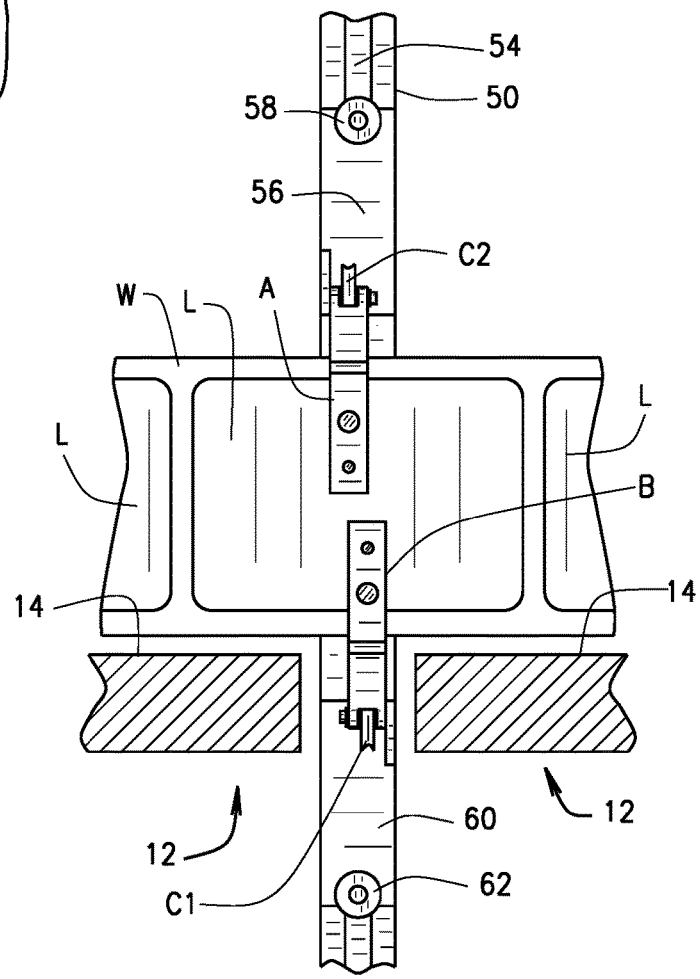

LABEL COUNTING REWIND MACHINE

CROSS REFERENCE TO RELATED APPLICATIONS

No applicable.

STATEMENT REGARDING FEDERALLY SPONSORED RESEARCH OR DEVELOPMENT

Not applicable.

BACKGROUND OF THE INVENTION

This invention relates generally to a device or system for counting labels secured to a label web, and more particularly to a novel label web inspection and counting apparatus (also known in the industry as a label rewind and inspection machine), that provides an improved counting capability over traditional systems so as to greatly minimize the potential for miscounts of the labels.

In the label manufacturing industry, large quantities of labels are often manufactured on rolls produced with a backing material known in the industry as a "web" or "liner". Such labels are typically secured sequentially along the length of the web with an adhesive that allows the label to be readily removed or "peeled off" the web when so desired. Such rolls of labels may contain hundreds, or even thousands, of labels mounted on a single web. Each label is separated from the next label in the sequence by a gap, such that the web is exposed in the area of the gap between each of the labels.

For various quality assurance purposes, it may be desirable to count the actual number of labels on a particular roll. In some circumstances, for example, sample rolls may be chosen for counting from a production run or batch, while in other circumstances each roll must have a full label count.

Label counting is particularly important in regulated industries, such as for example, in the pharmaceutical industry. For example, when producing labels for bottles to store or distribute controlled medications (e.g., pills), the label count provides one means to ensure accurate tracking of the controlled substances (pills), and therefore must precisely correspond to the number of bottles in which the pills will be placed. The manufacture and packaging of controlled medications (e.g., pills) is heavily regulated, and penalties for inaccurate tracking or poorly implemented quality control procedures can be severe. It is therefore critical for such applications that the label counter accurately determine the exact number of labels on each roll.

Typical web label counters comprise a pair of large spindles or "core holders" or "mounts", often positioned vertically on a tabletop, each measuring approximately one to three inches in diameter and from several inches to a foot or more in height. One of the spindles is known as the "unwind" spindle and the other spindle is known as the "rewind" spindle. A number of pins, rollers and guides are positioned on the same plane as the spindles, some of which are used as tensioners. These pins, rollers and guides form what is known as a "web path" between the two spindles through which the web of a roll of labels is threaded. In addition, one or more label detectors or sensors are positioned along the web path. To conduct a label count for a roll of labels, the roll is installed on the unwind spindle and the lead or free-end of the roll is drawn away from the spindle, threaded through the pins and rollers and guides in a predetermined path, and then attached to the rewind spindle. Motors attached to the spindles are then activated, and the web (with the labels attached) is drawn from the unwind spindle along the web path and onto the rewind spindle. As the web is drawn past the label sensor, the sensor indexes a count to determine the number of labels that pass the sensor.

Traditionally, label web counters use a gap sensor to identify when a label has passed through the web path as the basis for a counting system to count labels on a label roll. Such sensors may operate with the use of optics, magnetism or other detection means. One type of optical gap sensor, for example, detects the difference in the contrast between the labels and the web on which the labels are attached. Each time a gap between labels passes the sensor, the sensor instructs a computer control system to increase the label count by one. Hence, typical gap counters increase the label count each time they sense the trailing edge of a label.

Such traditional counting configurations, which rely upon a single gap sensor, provide reasonably good counts, but suffer from several shortcomings that can result in inaccurate counts. More specifically, these traditional single detector gap sensors can miss-trigger and produce an erroneous count should the label edge stop when positioned in or near the detection zone of the gap sensor, or should the web flutter while the web is running through the web path. Starts and stops, as well as operational disruptions can also adversely impact the count.

It would therefore be desirable to have a label counter or a system for a label counter that would produce accurate label counts even when the label counter malfunctions, such as for example when the spindles stop, the system otherwise halts the progress of the web through the web path, or the system causes the web to flutter in the web path. As will become evident in this disclosure, the present invention provides benefits over the existing art.

BRIEF DESCRIPTION OF THE DRAWINGS

The illustrative embodiments of the present invention are shown in the following drawings which form a part of the specification:

FIG. 5 is a perspective view of the quadrature counting guide of the label rewind and inspection machine of FIG. 1, with a section of label web tracking through the guide;

FIG. 5A is a side view of the upper sensor A of the quadrature counting guide of the label rewind and inspection machine of FIG. 5;

FIG. 5B is a side view of the lower sensor B of the quadrature counting guide of the label rewind and inspection machine of FIG. 5;

FIG. 6 is a plan view of the quadrature counting guide and section of label web tracking through the guide of FIG. 5;

Corresponding reference characters indicate corresponding parts throughout the several views of the drawings.

DETAILED DESCRIPTION

Figure 1:
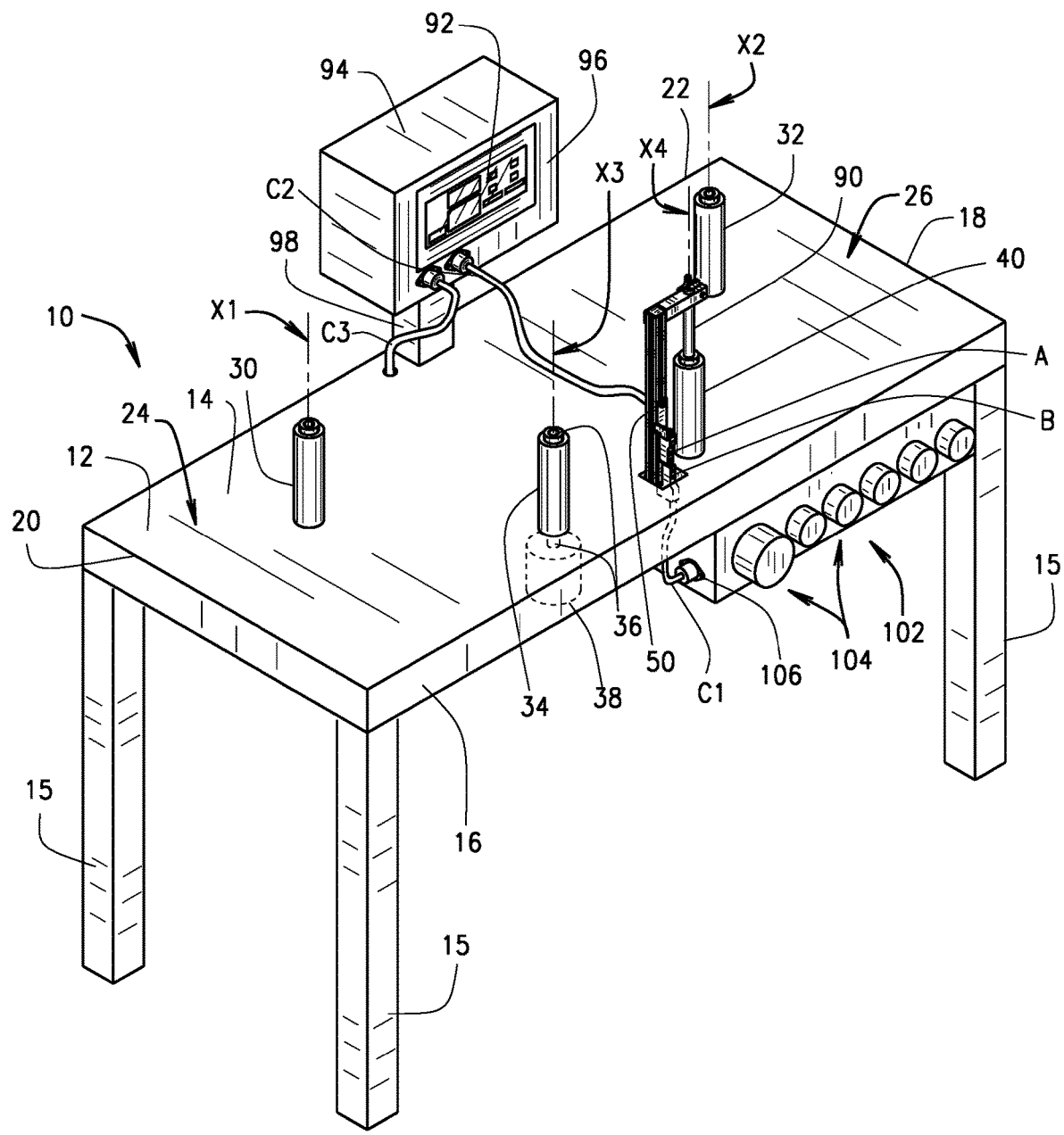
FIG. 1 is a perspective view of a label rewind and inspection machine incorporating a first embodiment of the present invention.

The following detailed description illustrates the claimed invention by way of example and not by way of limitation. This description will enable one skilled in the art to make and use the claimed invention, and describes several embodiments, adaptations, variations, alternatives and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. Rather, the invention is intended to cover all alternative embodiments and modifications that fall within the spirit and scope of the invention as defined by the claims included herein as well as any equivalents of the disclosed and claimed invention. Hence, the claimed invention is capable of other embodiments and of being practiced or being carried out in various ways. Also, it is to be understood that the phraseology and terminology used herein is for the purpose of description and should not be regarded as limiting.

Figure 2:
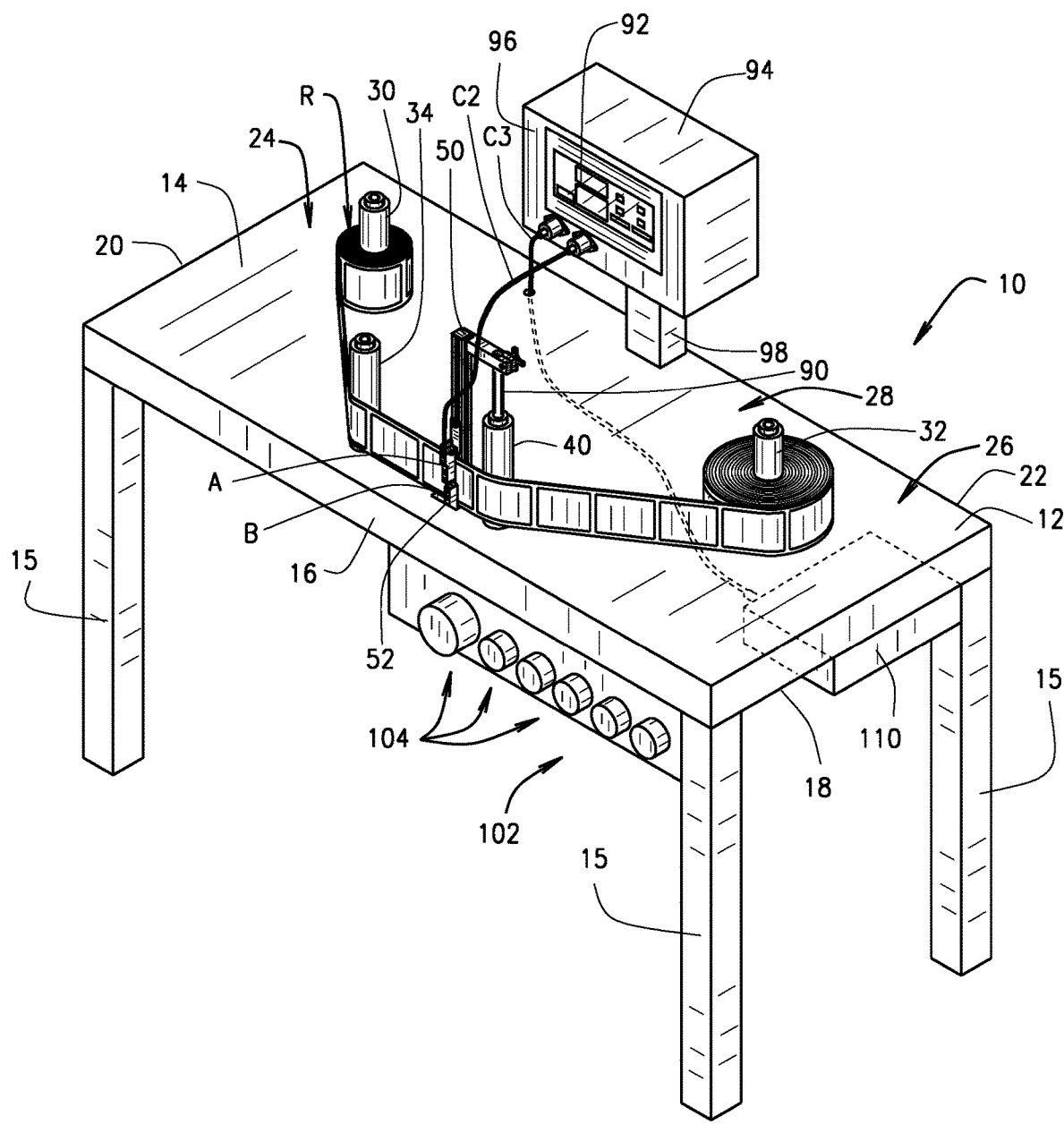
FIG. 2 is a perspective view of the label rewind and inspection machine of FIG. 1, with a roll of labels positioned on the unwind spindle, wound through the web path, and partially wound on the rewind spindle.

Turning to the drawings, a first embodiment of the novel label rewind and inspection ("label rewind") machine is shown generally at 10 in FIGS. 1-2 where the present invention is depicted by way of example. The label rewind machine 10 has a flat and rectangular stainless steel tabletop 12 that is approximately four feet wide, two and a half feet deep and ⅝ inch thick, with an upper surface 14. The tabletop 12 is constructed of a half-inch thick aluminum core that is covered with a 1/16 inch thick stainless steel skin. The tabletop 12 is supported by four vertical legs 15, with one leg 15 positioned at each corner of the tabletop 12. The upper surface 14 has a straight front edge 16, a straight right edge 18 that is perpendicular to the front edge 16, a straight left edge 20 that is parallel to the right edge 18, and a straight rear edge 22 that is parallel to the front edge 16. The front edge 16, left edge 20 and rear edge 22 generally define a left hand portion 24 of the tabletop 12. Likewise, the front edge 16, right edge 18 and rear edge 22 generally define a right hand portion 26 of the tabletop 12. Between the left hand portion 24 and the right hand portion 26 is a central portion 28 of the tabletop 12.

A cylindrical metal unwind spindle (or core holder) 30 projects upward perpendicularly from the upper surface 14 of the tabletop 12 at a position toward the rear of the left hand portion 24, as shown. The unwind spindle 30 is approximately three inches in diameter, and is available in three models, which extend above the tabletop 12 approximately seven, ten or thirteen inches, depending on the model. The unwind spindle 30 is configured to rotate about its vertical central axis X1. In some configurations, the unwind spindle 30 may include a set of vertical, pneumatic pressure plates or other similar devices (not shown) that expand with pressure to releasably secure a label roll on the unwind spindle 30. An electric motor (not shown) is positioned under the tabletop 12 and provides drive to selectively rotate the unwind spindle 30 clockwise or counterclockwise. Of course, the unwind spindle 30 can alternately be rotated by a variety of mechanisms and drives, including for example a hand crank or a servo motor.

A matching cylindrical metal rewind spindle (or core holder) 32 projects upward perpendicularly from the upper surface 14 of the tabletop 12 at a position toward the rear of the right hand portion 26, as shown. Like the unwind spindle 30, the rewind spindle 32 is approximately three inches in diameter, and is available in three models, which extend above the tabletop 12 approximately seven, ten or thirteen inches, depending on the model. The rewind spindle 32 is configured to rotate about its vertical central axis X2. In some configurations, the rewind spindle 32 may include a set of vertical, pneumatic or spring-loaded pressure plates or other similar devices (not shown) that expand or compress under pressure to releasably secure a label roll on the rewind spindle 32. An electric motor (not shown) is positioned under the tabletop 12 and provides drive to selectively rotate the rewind spindle 32 clockwise or counterclockwise. Of course, the rewind spindle 32 can alternately be rotated by a variety of mechanisms and drives, including for example a hand crank or a servo motor.

A cylindrical encoder roller 34 projects upward perpendicularly from the upper surface 14 of the tabletop 12 at a position toward the front of the central portion 28 proximate the left hand portion 24, as shown. Like the unwind spindle 30, the encoder roller 34 is approximately three inches in diameter, and is available in three models, which extend above the tabletop 12 approximately seven, ten or thirteen inches, depending on the model. The encoder roller 34 is configured to rotate about its vertical central axis X3. An encoder shaft 36, coaxial with the encoder roller 34, extends several inches downward through the tabletop 12 and attaches to an electronic encoder 38. The electronic encoder 38 measures the length of the web and the speed of the web as it passes through the rewind machine 10.

A cylindrical idler roller 40 projects upward perpendicularly from the upper surface 14 of the tabletop 12 at a position toward the front of the central portion 28 proximate the right hand portion 26, as shown. Like the encoder roller 34, the idler roller 40 is approximately three inches in diameter, and is available in three models, which extend above the tabletop 12 approximately seven, ten or thirteen inches, depending on the model. The idler roller 40 is configured to rotate freely about its vertical central axis X4.

A long and straight vertical sensor mount 50 formed of rectangular extruded aluminum extends upward perpendicularly from the upper surface 14 of the tabletop 12 at a position toward the front of the central portion 28 approximately midway between the left hand portion 24 and the right hand portion 26, as shown. The sensor mount 50 has a uniform cross-sectional shape that is generally square with sides of approximately one inch width each, extends downward approximately ten inches through a substantially square hole 52 in the tabletop 12, and extends upward between seven to thirteen inches above the tabletop 12. The sensor mount 50 is configured with four central "T" slots 54, one on each of its four sides, that each extend vertically perpendicular to the tabletop 12. (See FIGS. 5 and 6).

A first electronic sensor A is mounted on an aluminum angle bracket 56, which in turn is mounted with a screw fitting 58 to the forward-facing slot 54 in the sensor mount 50. Likewise, a second electronic sensor B is mounted on a different aluminum angle bracket 60, which in turn is mounted with a screw fitting 62 to the forward-facing slot 54 in the sensor mount 50. The bracket 56 is mounted on the sensor mount 50 above the bracket 60 such that sensor A is attached to the sensor mount 50 at a position several inches above sensor B with a gap of approximately one quarter inches between the two sensors.

Sensor A (see FIG. 5A) is a U-shaped light intensity sensor that includes a light emitter 70 and a corresponding light detector 72. The light emitter 70 is positioned on a straight and elongated first leg 74 while the light detector 72 is positioned on a straight and elongated second leg 76, with a narrow gateway or slot 78 there between. The slot 78 has an open end 79. The light detector 72 is oriented to face the light emitter 70 across the slot 78. The light emitter 70 generates and emits a concentrated beam of light that is projected toward the light detector 72 across the slot 78 between the first and second legs, thereat creating a sensing zone Z1. The light detector 72 is adapted to detect the difference between light in the sensing zone Z1 that passes through a label roll web, such as the web W, and light that passes through a label and web, such as the web W and the label L.

Likewise, sensor B (see FIG. 5B) is a U-shaped light intensity sensor that includes a light emitter 80 and a corresponding light detector 82. The light emitter 80 is positioned on a straight and elongated first leg 84 while the light detector 82 is positioned on a straight and elongated second leg 86, with a narrow gateway or slot 88 there between. The slot 88 has an open end 89. The light detector 82 is oriented to face the light emitter 80 across the slot 88. The light emitter 80 generates and emits a concentrated beam of light that is projected toward the light detector 82 across the slot 88 between the first and second legs, thereat creating a sensing zone Z2. The light detector 82 is adapted to detect the difference between light in the sensing zone Z2 that passes through a label roll web, such as the web W, and light that passes through a label and web, such as the web W and the label L.

Referring to FIGS. 5 and 6, it can be seen that when sensor A is secured to the bracket 58, it is oriented such that the legs 74 and 76 are directed upward and the open end 79 is positioned at the top of the sensor A. In contrast, when sensor B is secured to the bracket 62, it is oriented such that the legs 84 and 86 are directed downward and the open end 89 is positioned at the bottom of the sensor B. Further, the brackets 58 and 62 are constructed such that sensor A and sensor B are horizontally (i.e., laterally) offset from one another by a distance of less than an inch.

Figure 7:
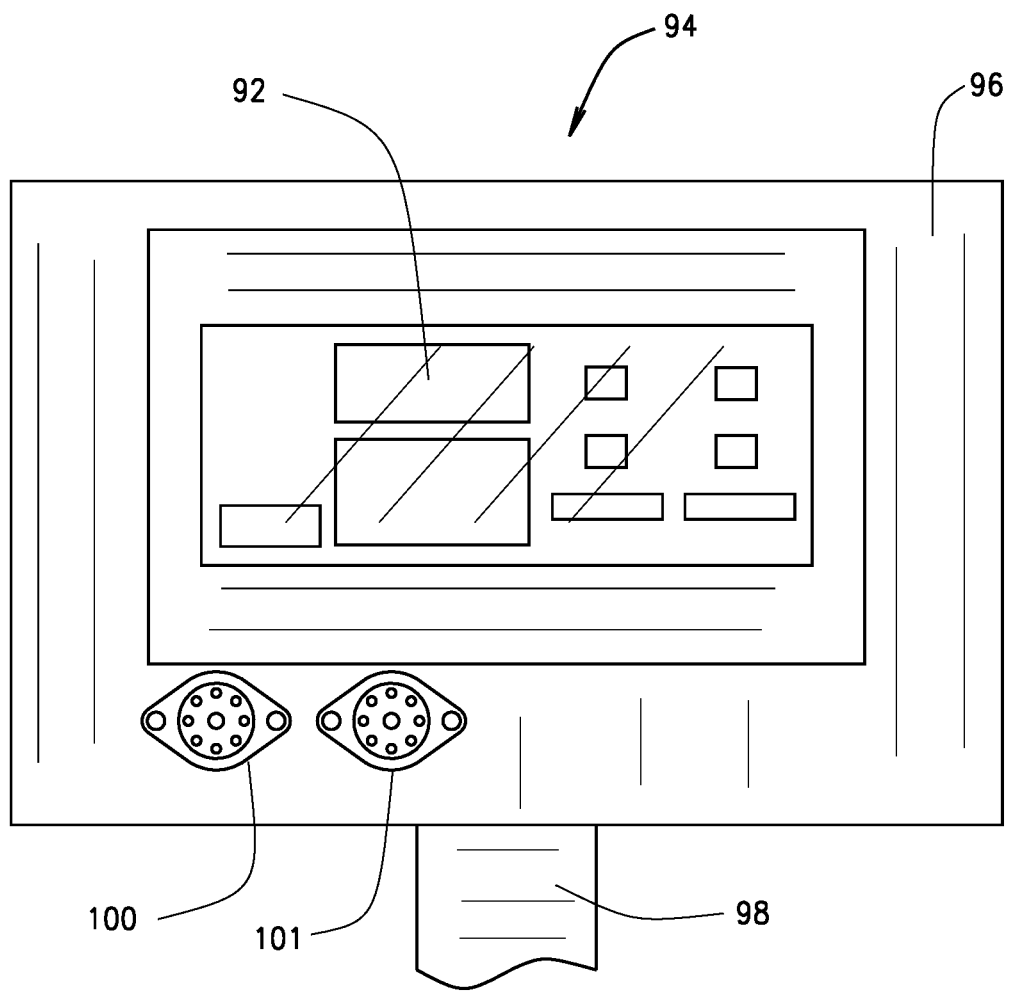
FIG. 7 is a plan view of the digital display of the quadrature counting guide of the label rewind and inspection machine of FIG. 1.

Turning back to FIGS. 1 and 2, an adjustable rigid bracket 90 extends vertically from the upper end of the idler roller 40 and crosses over to attach to the upper end of the sensor mount 50 to help stabilize the mount 50. Referring particularly to FIGS. 1, 2 and 7, it can also be seen that a small electronic digital display 92, which provides real-time information to the system operator, is mounted in a rigid rectangular housing 94 with a front bezel 96. A square aluminum post 98 extends approximately ten inches from the base of the housing 94 to the upper surface 14 of the tabletop 12 where the post 98 is secured to the tabletop 12. Two cable ports 100 and 101 are positioned in lower left-hand corner of the front bezel 96.

A horizontal control panel 102 is attached to the underside of the right hand portion 26 of the tabletop 12 just below the front edge 16. The control panel 102 contains a set of various controls and gauges 104 that are spaced apart horizontally across the front of the panel. On the side of the control panel 102 is a cable port 106, where an electronic cable C1 extends from and operatively attaches to sensor B below the tabletop 12.

As can be seen in FIG. 2, a programmable computer controller 110 is positioned under the tabletop 12 behind the control panel 102. The computer controller 110 is operatively associated with and monitors and/or controls each of the rewind machine 10 components as appropriate for the proper operation of the rewind machine 10, including the system's label counting function.

Referring again to FIGS. 1, 2 and 7, an electronic cable C2 extends from and operatively attaches sensor A to the digital display 92 via the right-hand port 100 of the digital display 92. Further, an electronic cable C3 extends from and operatively attaches the computer controller 110 to the digital display 92 via the left-hand port 101.

Figure 3:
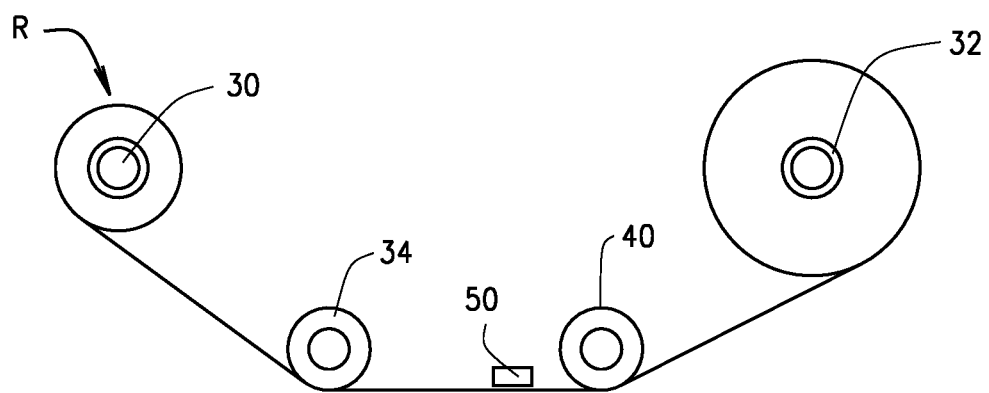
FIG. 3 is a top schematic view of the spindle components of the label rewind and inspection machine of FIG. 1, with a roll of labels positioned on the unwind spindle, wound through the web path, and partially wound on the rewind spindle.

As depicted in FIGS. 2 and 3, a roll of labels R is positioned on the unwind roller 30. Label rolls, such as for example the roll R, comprise a large number of labels L affixed to one side of an extended backing strip known as a "web", such as for example the web W. (See FIGS. 5 and 6). The individual labels, such as for example the labels L, are attached to the web W with an adhesive backing.

To ready the rewind machine 10 for label counting, a label roll such as R is placed on the unwind spindle 30. The free end of the roll R is then extended from the rewind spindle 30, across and around the encoder roller 34, threaded through both of the sensors A and B between the legs 74 and 76 of sensor A and between the legs 84 and 86 of sensor B, extended across and around the idler roller 40, and then attached to the rewind spindle 32. As can be appreciated, when power is provided to the electric motor driving the unwind spindle 30 to unwind the roll R, and power is provided to the electric motor driving the rewind spindle 32 to unwind the roll R, the label web W traverses from the unwind spindle 30 to the rewind spindle 32 through both sensors A and B. As this occurs, the rewind machine 10 counts the number of labels L that pass the sensors A and B.

The rewind machine 10 conducts a label count using sensors A and B through the operation of a quadrature sensor detection sequence. That is, in order for the rewind machine 10 to recognize and therefore count a label, such as L, on a web, such as W, the rewind machine 10 requires that the sensors A and B generate a particular sequence of signals that confirm the presence of a single label L. In order to accomplish this, the sensors A and B are both adapted to generate a set of electronic signals indicative of the presence of a label on the web passing through the sensor A slot 78 and the sensor B slot 88.

In this regard, the sensor A will generate an electronic ON signal when the light detector 72 detects a light emission from the light emitter 70 having an intensity level in the sensing zone Z1 that indicates the beam of light only passed through the web, such as the web W. Alternately, the sensor A will generate an electronic OFF signal when the light detector 72 detects a light emission from the light emitter 70 having an intensity level in the sensing zone Z1 that indicates the beam of light passed through the web and a label on the web, such as the web W and the label L. Likewise, the sensor B will generate an electronic ON signal when the light detector 82 detects a light emission from the light emitter 80 having an intensity level in the sensing zone Z2 that indicates the beam of light only passed through the web, such as the web W. Alternately, the sensor A will generate an electronic OFF signal when the light detector 82 detects a light emission from the light emitter 80 having an intensity level in the sensing zone Z2 that indicates the beam of light passed through the web and a label on the web, such as the web W and the label L.

Figure 8:
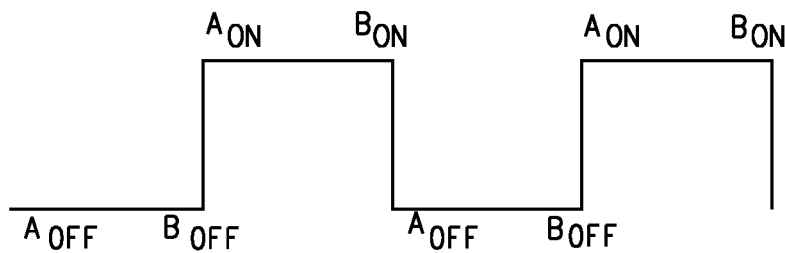
FIG. 8 is a schematic of one embodiment of an electronic signal diagram for the label rewind and inspection machine of FIG. 1.
Figure 9:
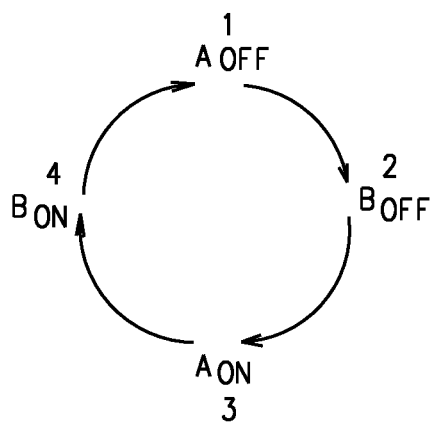
FIG. 9 is a schematic of a second embodiment of an electronic signal diagram for the label rewind and inspection machine of FIG. 1.
Figure 10A:
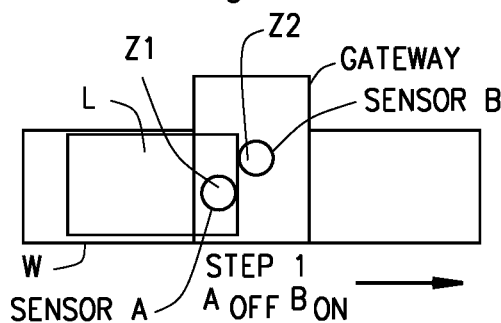
FIGS. 10A-10D diagrammatically depict the staging steps of a representative label detection and count sequence for the label rewind and inspection machine of FIG. 1.
Figure 10B:
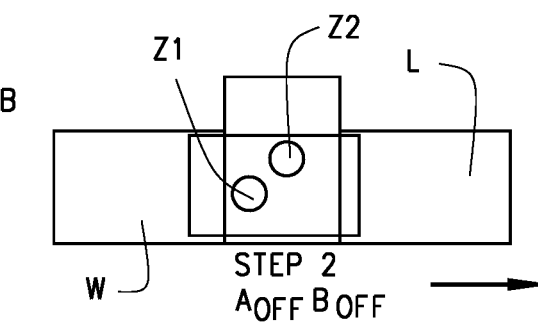
Figure 10C:
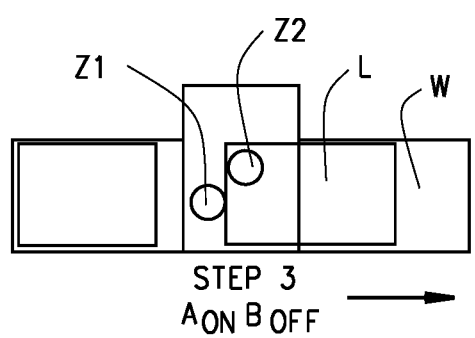
Figure 10D:
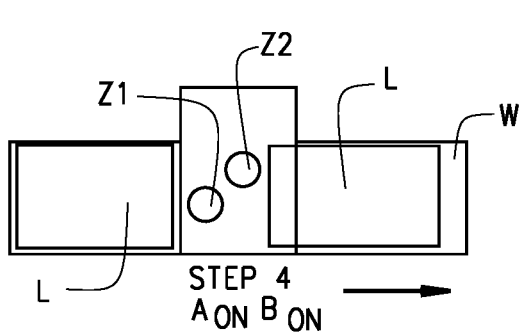

Because sensor A is separated horizontally (i.e., laterally) from sensor B, sensing zone Z1 is likewise separated horizontally (i.e., laterally) from sensing zone Z2, although there may be some partial horizontal (i.e., lateral) positional overlap of the sensing zones. That is, a portion of sensing zone Z1 may horizontally align with a portion of the sensing zone Z2, but due to vertical displacement or separation, the zones Z1 and Z2 may or may not actually touch one another. Due to this horizontal separation of the sensing zones Z1 and Z2, the sensors A and B will therefore sequentially generate their respective ON and OFF signals in response to the different conditions that occur in the sensing zones Z1 and Z2 as the web W passes each of the sensors in sequential order. This sequencing is schematically depicted in FIGS. 8 and 9, and diagrammatically depicted in FIGS. 10A-10D, where the sensors A and B, and their respective sensing zones Z1 and Z2 are shown. It can be seen that the label roll R travels from left to right through the gateways or slots 78 and 88 of the sensors A and B, and as it does so, labels L attached to the web W pass through the sensing zones Z1 and Z2. As this occurs, the sensors A and B generate respective OFF and ON signals as indicated in Steps 1-4 of FIGS. 10A-10D. That is, when a label L is positioned in sensing zone Z1 but not in sensing zone Z2 (FIG. 10A), sensor A will generate an OFF signal while sensor B will be generating an ON signal. Then, when label L is positioned in both sensing zones Z1 and Z2 (FIG. 10B), sensors A and B will both generate OFF signals. Next, when label L is positioned in sensing zone Z2 but not in sensing zone Z1 (FIG. 10 C), sensor A will generate an ON signal while sensor B will be generating an OFF signal. Finally, when no label L is positioned either sensing zone Z1 or sensing zone Z2 (FIG. 10D), sensors A and B will both generate ON signals.

As can be appreciated by one of ordinary skill in the art, while it is important that this sequence of Steps 1-4 occur in the order of FIGS. 10A-10D, it is not necessary that this sequence of Steps 1-4 start with Step 1. Rather, the sequence may be initiated by starting with any of the Steps and continuing with the remaining Steps in the same order as shown in FIGS. 10A-10D. For example, the sequence could start with Step 2, then continue through Steps 3, 4 and 1—in that order. By way of further example, the sequence could start with Step 4, then continue through Steps 1, 2 and 3—in that order.

The electronic OFF and ON signals generated by the sensors A and B are each electronically communicated to the computer controller 110, where the signals are registered and recorded. The computer controller 110 utilizes a set of programmable computer instructions that record the sequence of the OFF and ON signals as they are generated by the sensors A and B and compares them to a specific sequence that triggers the designation of a unitary count for the presence of a single label on the label web. That is, the computer controller 110 translates the electronic OFF and ON signals generated by the sensors A and B into a label count. In particular, as depicted in FIGS. 8-9, the computer controller 110 will generate a count of one label when the computer controller 110 records the following "triggering" sequence of electronic OFF and ON signals generated by the sensors A and B:

(i) sensor B=ON and sensor A=OFF;
(ii) sensor B=OFF and sensor A=OFF;
(iii) sensor B=OFF and sensor A=ON; and
(iv) sensor B=ON and sensor A=ON.

Each time this sequence is repeated, the computer controller 110 will increase the label count by one label. In this way, the rewind machine 10 creates an accurate count of the number of labels L on the web W of the label roll R that is run past the sensors A and B. The computer controller 110 records the label count in electronic memory, and displays each such count as a digital image on the digital display 92. Of course, the label count can be erased and/or reset by the rewind machine 10 operator at any time through operation of the computer controller 110, including when the switching label rolls R on the rewind machine 10.

While I have described in the detailed description several configurations that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel rewind can be arranged in a number of other and related varieties of configurations without departing from or expanding beyond the scope of my invention as set forth in the claims.

Figure 4:
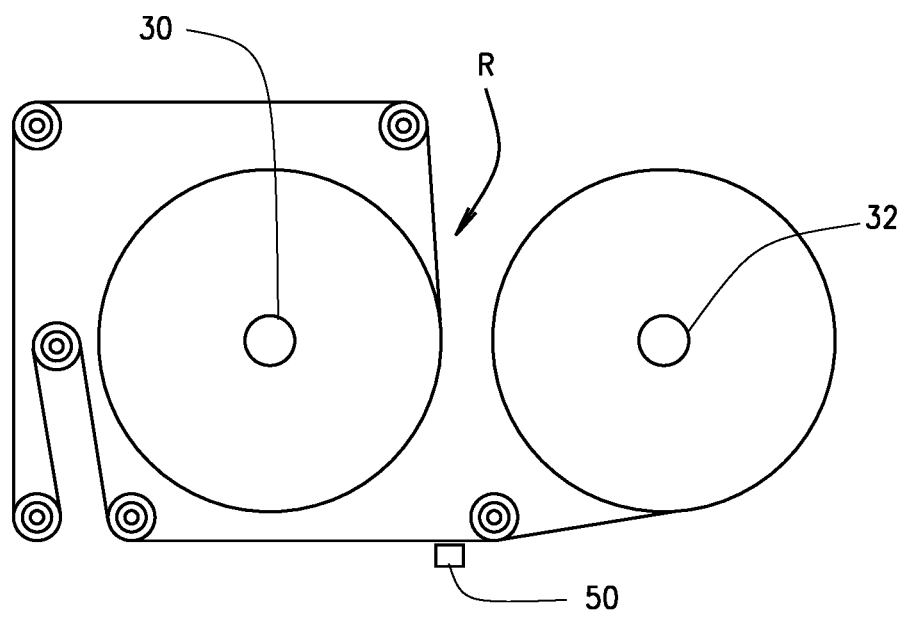
FIG. 4 is a top schematic view of the spindle components of a label rewind and inspection machine incorporating a second embodiment of the present invention, with a roll of labels positioned on the unwind spindle, wound through the web path, and partially wound on the rewind spindle.

For example, the rewind machine 10 is not limited to the exact number, size or orientation of spindles and rollers as depicted in the FIGS. 1-3. Rather, the number and orientation of the various spindles and rollers can vary substantially depending upon a wide variety of design and engineering considerations. For example, FIG. 4 depicts an alternate spindle and roller arrangement for a rewind that incorporates six different rollers in addition to the unwind and rewind spindles of the rewind machine 10, but is nonetheless configured with the quadrature counting capability of the rewind machine 10. A wide variety of such rewind configurations can be utilized that are contemplated by this disclosure so long as such rewind is configured such that it is capable of performing a quadrature count of the labels L on the web W of each label roll R placed on the rewind.

In addition, while the rewind machine 10 has been described as directing the label web W from left to right, where the unwind spindle 30 is positioned in the left hand portion 24 of the tabletop 12 and the rewind spindle 32 is positioned in the right hand portion 26 of the tabletop 12, the system is also configured for the reverse operation. That is, the label roll R can be positioned on the spindle 32, and directed from right to left, through the sensors A and B, and onto the spindle 30. In such reverse operation, the rewind machine 10 will still be able to perform the quadrature count. However, the triggering sequence that generates each unitary label count for this right-to-left operation will be the reverse of the triggering sequence for the rewind machine 10 in left-to-right operation.

Further, while the rewind machine 10 utilizes light emitting and detecting sensors A and B, a variety of other sensor types, of various sizes and shapes, may be used instead. For example, the sensors A and B may be configured to detect sound, magnetic fields or even reflected light, instead of transmitted light. In addition, instead of measuring transmissivity, the sensors A and B can for example be configured to measure depth or height in order to detect the labels L on the web W based upon the added height of the labels L above the web W. By way of further example, the sensors A and B can also be configured to measure the difference in physical thickness between the web W and web W with a label L. Further, the sensors A and B can alternatively be adapted to detect the difference in contrast between the labels L and the web W.

The computer controller 110 can comprise a wide variety of calculating and/or computing devices, including for example, various microprocessors, memory units, monitors, and mechanical calculating devices, so long as the devices utilized is capable of providing the finality described in this disclosure.

The rewind machine 10 does not require the presence of the digital display 92. Rather, the label count can be communicated from the computer controller 110 to a wide variety of associated systems for upload and review. For example, the computer controller 110 can be linked to another computer or computer system—e.g., directly, via the Internet, via an Intranet, via wireless communication such as Bluetooth or WiFi, etc.—where the count data can be stored, displayed and/or analyzed.

Additional variations or modifications to the configuration of the novel label rewind machine and label counting machine of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of my invention.

What is claimed is:

1. A label rewind machine adapted to count labels on a label roll, said label roll comprising a hub and label web with a plurality of labels secured sequentially along said label web, said label web being wound about the hub of the label roll, said rewind machine comprising:
   a. a first spindle having a substantially straight and elongated first coreholder with a first axis of rotation running substantially through the center of said first coreholder, said first coreholder being shaped and sized to releasably accept the label roll hub such that said label roll may rotatably wind or unwind generally about said first spindle;
   b. a second spindle having a substantially straight and elongated second coreholder with a second axis of rotation running substantially through the center of said second coreholder, said second coreholder being shaped and sized such that the label web may rotatably wind or unwind generally about said second spindle, the second spindle being separated from the first spindle;
   c. a web path located between the first spindle and the second spindle, said web path defining a route of travel for the label web from the first spindle to the second spindle;
   d. a first drive operatively associated with the second spindle, said first drive rotating the second spindle to urge the label web to travel between the first spindle and the second spindle along the web path when the web is attached to the second spindle;
   e. a first sensor situated at a first position along the web path, said first sensor having a first sensing zone, said first sensor detecting one of said plurality of labels secured to the label web and generating an electronic OFF signal when said label is positioned in the sensing zone, said first sensor generating an ON signal when no label is positioned in said first sensing zone;
   f. a second sensor situated at a second position along the web path, said second sensor having a second sensing zone, said second sensor detecting said one of said plurality of labels secured to the label web and generating an electronic OFF signal when said label is positioned in the second sensing zone, said second sensor generating an ON signal when no label is positioned in said second sensing zone, said second sensor communicating said ON signal to the computer controller;
   g. a computer controller operatively communicating with and operating said first drive to controllably rotate the second spindle, said computer controller electronically storing a desired label detection signal sequence, said computer controller receiving said OFF and ON signals from the first and second electronic sensors separately and comparing said separately received OFF and ON signals to said electronically stored sequence, said computer controller generating a unitary label count when said OFF and ON signals match said electronically stored sequence;
   wherein the label detection signal sequence electronically stored in the computer controller comprises:
   a. the simultaneous generation of an OFF signal from the first sensor and an ON signal from the second sensor; followed by
   b. the simultaneous generation of an OFF signal from both the first and second sensors; followed by
   c. the simultaneous generation of an ON signal from the first sensor and an OFF signal from the second sensor; followed by
   d. the simultaneous generation of an ON signal from both the first and second sensors; and
   wherein the computer controller is adapted and configured to index the label count by one upon: (i) the simultaneous generation of the first OFF signal and the second ON signal; followed by (ii) the simultaneous generation of the first OFF signal and the second OFF signal; followed by (iii) the simultaneous generation of the first ON signal and the second OFF signal; followed by (iv) the simultaneous generation of the first ON signal and the second ON signal.

2. The label rewind machine of claim 1, wherein the first sensor comprises one of an optical sensor, a magnetic sensor, and a tactile sensor.

3. The label rewind machine of claim 1, wherein one of said first and second sensors is electronic.

4. The label rewind machine of claim 1, wherein the web path defines a route of travel for the label web from the second spindle to the first spindle.

5. The label rewind machine of claim 1, wherein said first axis of rotation is parallel to said second axis of rotation.

6. The label rewind machine of claim 1, further comprising an electronic display operatively associated with the computer controller, said computer controller converting the unitary label count into an electronically displayable image indicative of said label count, and displaying said displayable image on the digital display.

7. The label rewind machine of claim 1, wherein the computer controller electronically stores the indexed label count.

8. A label counting system for a label rewind machine adapted to count labels on a label roll, said label roll comprising a hub and label web with a plurality of labels secured sequentially along said label web, said label web being wound about the hub of the label roll, said rewind machine urging the label web to traverse a web path on said rewind machine, the counting system comprising:
   a. a first sensor situated at a first position along said web path, said first sensor having a first sensing zone, said first sensor detecting one of said plurality of labels secured to the label web and generating an electronic OFF signal when said label is positioned in said the sensing zone, said first sensor generating an ON signal when no label is positioned in said first sensing zone;
   b. a second sensor situated at a second position along said web path, said second sensor having a second sensing zone, said second sensor detecting said one of said plurality of labels secured to the label web and generating an electronic OFF signal when said label is positioned in the second sensing zone, said second sensor generating an ON signal when no label is positioned in said second sensing zone, said first and second sensing zones being separated along the web path by a gap there between, the gap extending along the web path;
   c. a computer controller electronically storing a desired label detection signal sequence, said computer controller receiving said OFF and ON signals from the first and second electronic sensors separately and comparing said separately received OFF and ON signals to said electronically stored sequence, said computer controller generating a unitary label count when said OFF and ON signals match said electronically stored sequence.

9. The label counting system of claim 8, wherein the label detection signal sequence electronically stored in the computer controller comprises the following steps:
   a. the simultaneous generation of an OFF signal from the first sensor and an ON signal from the second sensor; followed by
   b. the simultaneous generation of an OFF signal from both the first and second sensors; followed by
   c. the simultaneous generation of an ON signal from the first sensor and an OFF signal from the second sensor; followed by
   d. the simultaneous generation of an ON signal from both the first and second sensors.

10. The label counting system of claim 8, wherein the first sensor comprises one of an optical sensor, a magnetic sensor, and a tactile sensor.

11. The label counting system of claim 8, wherein one of said first and second sensors is electronic.

12. A method of counting labels on a label roll using a label rewind machine, said label roll comprising a hub with a hub axis and an elongated web wound about said hub, said label roll further comprising a plurality of labels positioned sequentially along the length of a first face of the web, there being a gap between each label on said web, said label roll having a free end; said label rewind machine comprising a first spindle and a second spindle and a first and second sensor, and said first and second sensors positioned between said spindles; said first and second spindles being spaced apart horizontally, and said first and second sensors being spaced apart horizontally; said first sensor defining a first sensing zone and said second sensor defining a second sensing zone that does not fully overlap said first sensing zone; the method comprising:
   a. Mounting said label roll on said first spindle of the rewind machine;
   b. Extending the web through said first and second sensing zones and attaching the free end of the web to the second spindle;
   c. Urging the web to move from the first spindle toward the second spindle and through said first and second sensing zones;
   d. Detecting the presence of a label on the web by the first sensor when the label is positioned in the first sensing zone;
   e. Generating a first ON signal when the first sensor detects the web in the first sensing zone;
   f. Generating a first OFF signal when the first sensor detects the label in the first sensing zone;
   g. Generating a second ON signal when the second sensor detects the web in the second sensing zone;
   h. Generating a second OFF signal when the second sensor detects the label in the second sensing zone;
   i. Generating a single label count upon determination by a controller, based on an analysis of separate signals received from the first sensor and the second sensor, that the following separate signal states have occurred: (i) the simultaneous generation of the first OFF signal and the second ON signal; followed by (ii) the simultaneous generation of the first OFF signal and the second OFF signal; followed by (iii) the simultaneous generation of the first ON signal and the second OFF signal; followed by (iv) the simultaneous generation of the first ON signal and the second ON signal.

13. The method of claim 12, further comprising the step of directing the first face of the web toward the first sensor when the web is positioned in the first sensing zone.

14. The method of claim 12, further comprising the step of directing the second face of the web toward the second sensor when the web is positioned in the second sensing zone.

15. The method of claim 12, further comprising the step of urging one of said first and second spindles to rotate to cause the web to travel through one of said first and second sensing zones.

16. The method of claim 12, further comprising the step of recording said single label count.

17. The method of claim 16, further comprising the step of indexing the label count by one upon: (i) the simultaneous generation of the first OFF signal and the second ON signal; followed by (ii) the simultaneous generation of the first OFF signal and the second OFF signal; followed by (iii) the simultaneous generation of the first ON signal and the second OFF signal; followed by (iv) the simultaneous generation of the first ON signal and the second ON signal.

18. The method of claim 12, further comprising the step of recording one or more of said ON and OFF signals generated by the first and second sensors.

* * * * *